United States Patent
Park et al.

(10) Patent No.: US 9,235,877 B2
(45) Date of Patent: Jan. 12, 2016

(54) METHOD FOR DIRECTIONAL ADAPTIVE IMAGE INTERPOLATION AND AN ELECTRONIC DEVICE THEREOF

(71) Applicants: Samsung Electronics Co. Ltd., Suwon-si, Gyeonggi-do (KR); Chung-Ang University Industry-Academy Cooperation Foundation, Seoul (KR)

(72) Inventors: Min-Kyu Park, Seoul (KR); Joon-Ki Paik, Seoul (KR); Won-Seok Kang, Seoul (KR); Han-Sae Song, Seoul (KR); Young-Sam Yu, Suwon-si (KR); Jae-Hwan Jeon, Seoul (KR); Young-Kwon Yoon, Seoul (KR); Yong-Gu Lee, Seoul (KR)

(73) Assignees: Samsung Electronics Co., Ltd., Suwon-si (KR); Chung-Ang University Industry-Academy Cooperation Foundation, Seoul (KR)

( * ) Notice: Subject to any disclaimer, the term of this patent is extended or adjusted under 35 U.S.C. 154(b) by 169 days.

(21) Appl. No.: 13/930,410

(22) Filed: Jun. 28, 2013

(65) Prior Publication Data

US 2014/0016878 A1    Jan. 16, 2014

(30) Foreign Application Priority Data

Jul. 10, 2012 (KR) .................... 10-2012-0074959

(51) Int. Cl.
G06K 9/40 (2006.01)
G06T 5/00 (2006.01)
G06T 7/00 (2006.01)
G06T 3/40 (2006.01)

(52) U.S. Cl.
CPC .............. *G06T 5/003* (2013.01); *G06T 3/4007* (2013.01); *G06T 7/0085* (2013.01); *G06T 2207/20192* (2013.01)

(58) Field of Classification Search
None
See application file for complete search history.

(56) References Cited

U.S. PATENT DOCUMENTS 6,763,129 B1 * 7/2004 Honda et al. ............... 382/132
2009/0324136 A1 * 12/2009 Yamada et al. ............. 382/300

FOREIGN PATENT DOCUMENTS

KR    10-2010-0025805 A    3/2010

* cited by examiner

*Primary Examiner* — Eueng-Nan Yeh
(74) *Attorney, Agent, or Firm* — Jefferson IP Law, LLP (57) ABSTRACT

A method of operating an electronic device for image interpolation is provided. The method includes estimating a direction of pixels using a plurality of filters respectively corresponding to a plurality of angles, correcting the direction of the pixels using a direction of neighboring pixels, determining whether the direction estimation has an error according to a direction distribution of the neighboring pixels, and when the direction estimation is determined to have error, correcting the error in the direction estimation.

25 Claims, 10 Drawing Sheets

METHOD FOR DIRECTIONAL ADAPTIVE IMAGE INTERPOLATION AND AN ELECTRONIC DEVICE THEREOF

PRIORITY

This application claims the benefit under 35 U.S.C. §119(a) of a Korean patent application filed on Jul. 10, 2012 in the Korean Intellectual Property Office and assigned Serial No. 10-2012-0074959, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) Chung-Ang University Industry-Academy Cooperation Foundation.

BACKGROUND OF THE INVENTION

1. Field of the Invention

The present invention relates to image interpolation in an electronic device.

2. Description of the Related Art

A zoom function of a camera shortens a distance to an object being recorded. The zoom of an optical lens directly changes a focal length. However, the zoom of an optical lens is not suitable for a portable electronic device such as mobile phone, which is miniaturized and lightened. Hence, a digital zoom technique which increases an image resolution by interpolating an input image of the camera is more appropriate for the electronic device. Various image interpolation algorithms are applied to mobile cameras according to the related art.

A common algorithm applied to the mobile device according to the related art is a classical algorithm using linear combination, such as bilinear interpolation and bicubic interpolation. However, research has produced other algorithms including a least square estimation frequently applied to recent signal processing or communication, or adaptive directional image interpolation algorithm which features good interpolation performance in an edge region which is a high frequency component sensitive to human eyes. Frequency-domain image interpolation methods include Projection On Convex Set (POCS) interpolation including a wavelet image noise removal scheme.

However, it is hard to apply the methods according to the related art to the mobile electronic device because of limited hardware performance. In other words, because of the limited hardware performance in mobile electronic devices, it is difficult to apply the state-of-the-art technologies. Consequently, in a mobile environment, the use of an algorithm which does not require considerable computation or memory capacity is preferred. As a result, the digital zoom according to the related art is subject to abrupt jaggies (e.g., jagged diagonal edges) on the edges or blurring according to the image magnification.

Therefore a need exists for an apparatus and a method for enhancing digital zoom performance.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for enhancing digital zoom performance.

Another aspect of the present invention is to provide an apparatus and a method for mitigating jaggies on edges in a digital zoom.

Another aspect of the present invention is to provide an apparatus and a method for mitigating blurring in a digital zoom.

Another aspect of the present invention is to provide an apparatus and a method for interpolation by considering a pixel direction in a digital zoom.

In accordance with an aspect of the present invention, an operation method of an electronic device is provided. The method includes estimating a direction of pixels using a plurality of filters respectively corresponding to a plurality of angles, correcting the direction of the pixels using a direction of neighboring pixels, determining whether the direction estimation has an error according to a direction distribution of the neighboring pixels, and when the direction estimation is determined to have an error, correcting the error in the direction estimation.

In accordance with another aspect of the present invention, an electronic device is provided. The electronic device includes a memory for storing at least one software module executed by a processor, and the processor for executing the at least one software module. The at least one software module includes at least one instruction for estimating a direction of pixels using a plurality of filters respectively corresponding to a plurality of angles, correcting the direction of the pixels using a direction of neighboring pixels, determining whether the direction estimation has an error according to a direction distribution of the neighboring pixels, and when the direction estimation is determined to have an error, correcting the error in the direction estimation.

In accordance with yet another aspect of the present invention, an electronic device is provided. The electronic device includes a processor for estimating a direction of pixels using a plurality of filters respectively corresponding to a plurality of angles, correcting the direction of the pixels using a direction of neighboring pixels, determining whether the direction estimation has an error according to a direction distribution of the neighboring pixels, and when the direction estimation is determined to have an error, correcting the error in the direction estimation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present invention relates to image interpolation for enhancing digital zoom performance in an electronic device. Exemplary embodiments of the present invention provide a digital zoom function which enlarges an image in camera functions. For example, exemplary embodiments of the present invention provide a technique for enhancing a digital zoom performance in an electronic device. In particular, exemplary embodiments of the present invention provide a technique for mitigating jaggies and blurring.

Herein, the electronic device may be a portable electronic device and employ one of a smart phone, a portable terminal, a mobile phone, a mobile pad, a media player, a tablet computer, a handheld computer, and a Personal Digital Assistant (PDA). The electronic device may combine two or more functions of these devices.

A bilinear scheme and a bicubic scheme, which are most generally used among image interpolation algorithms, are simple and require no great computation, but suffer from serious degradation on the edges. In particular, as a magnification increases, jaggies on the edge of a diagonal line impairs the performance of the zoom function. A Least Square Error (LSE) algorithm is effectively applied to two-dimensional image data and thus exhibits fairly subjective image quality enhancement on the edges. Disadvantageously, the LSE algorithm still sharpens noise which is a high frequency component, and excessively emphasizes and distorts the edges. It is substantially hard to apply frequency-domain interpolation algorithms because such algorithms require much computation and memory. Disadvantageously, image interpolation algorithms according to the related art change texture or colors of an original image, or enable only integral-multiple zoom-in and disable decimal-multiple digital zoom.

According to the related art, the adaptive directional image interpolation algorithms utilize low-level direction estimation such as image brightness value comparison, and accordingly cannot accurately estimate noise or edge direction. However, according to exemplary embodiments of the present invention, jaggies or blurring is mitigated by estimating the direction on the image edge and adaptively applying the image interpolation algorithm according to the estimated direction.

Figure 1:
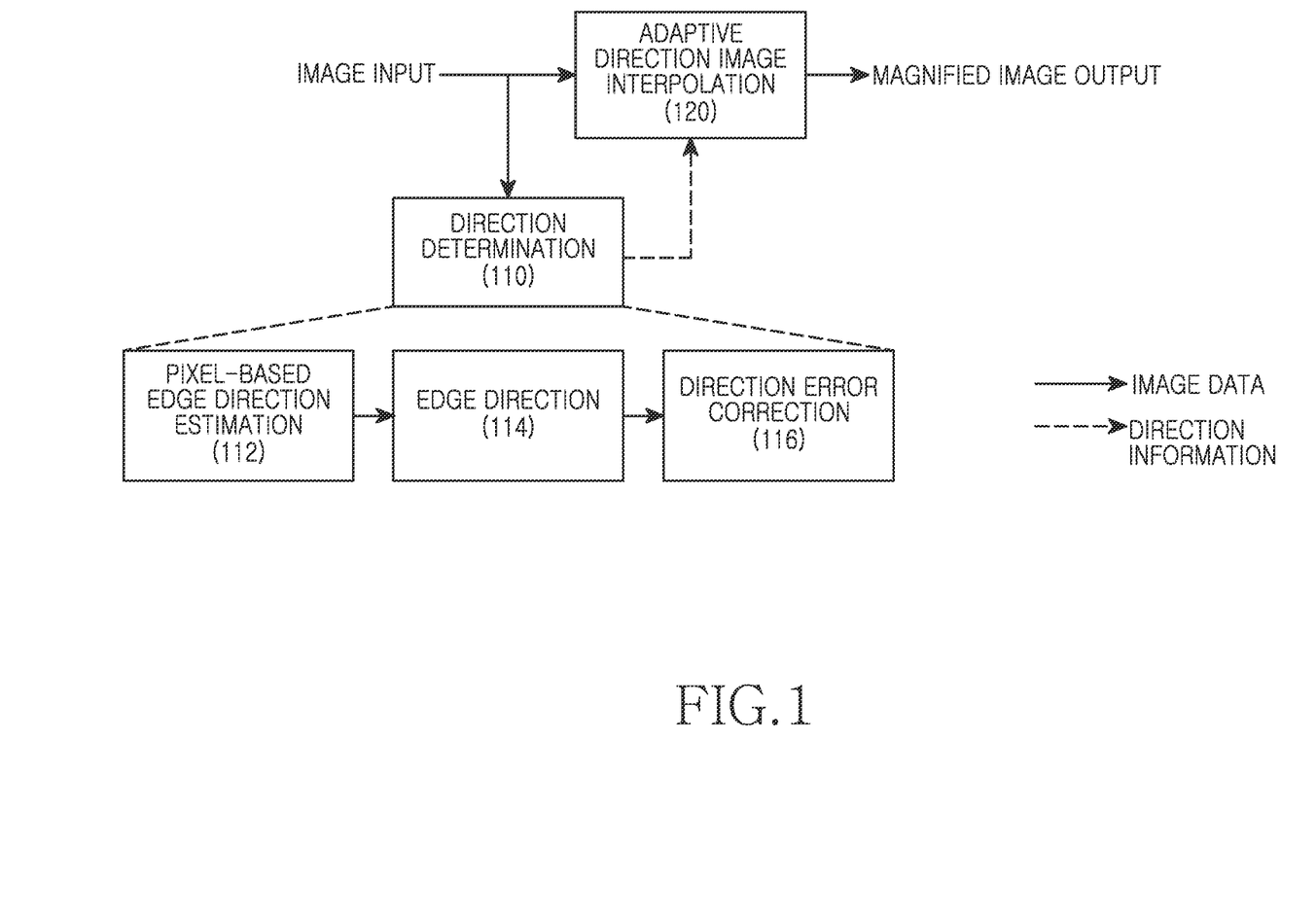
FIG. 1 illustrates a simplified digital zoom method according to an exemplary embodiment of the present invention.
Figure 2A:
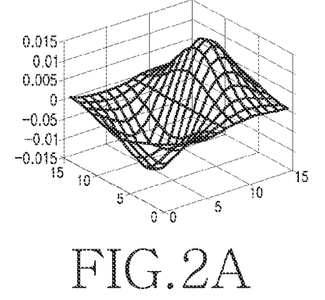
FIGS. 2A-2H illustrate steerable filters with various directions according to an exemplary embodiment of the present invention.
Figure 2B:
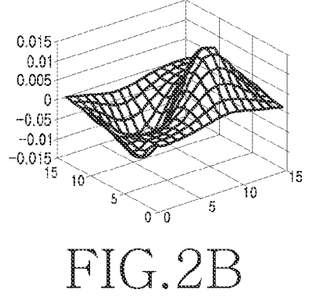
Figure 2C:
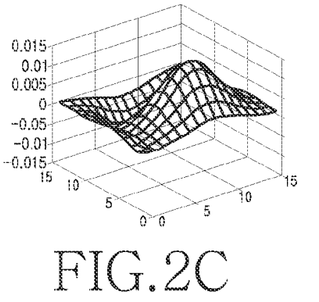
Figure 2D:
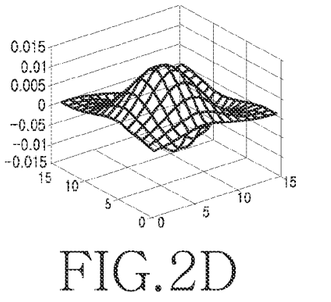
Figure 2E:
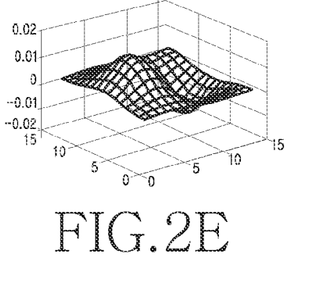
Figure 2F:
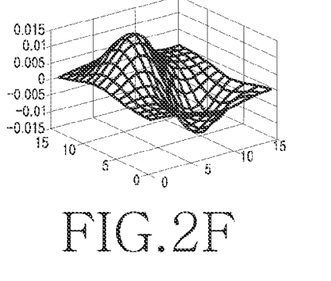
Figure 2G:
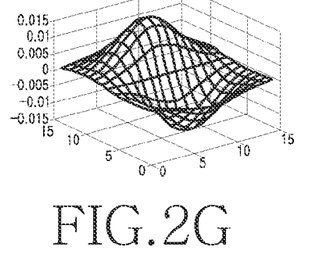
Figure 2H:
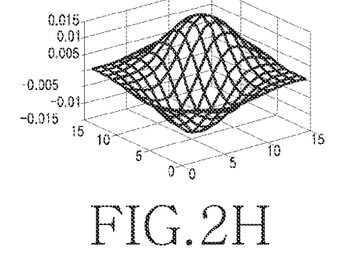

FIG. 1 illustrates a simplified digital zoom method according to an exemplary embodiment of the present invention.

Referring to FIG. 1, the digital zoom method largely includes a direction determination step 110 and an adaptive directional image interpolation step 120. When an initial image is input, in the direction determination step 110, the electronic device approximately estimates the edge direction per pixel in step 112, estimates an accurate edge angle through smoothing using a weight in step 114, and determines a final direction by determining whether the estimated direction has an error in step 116. In the adaptive directional image interpolation step 120, the electronic device adaptively interpolates the image in the finally estimated direction. Thus, the enlarged zoom image is output. Hereafter, the steps are further described.

First, the direction determination such as, for example, the direction determination described in relation to step 110 of FIG. 1 is explained.

The direction of the image input through a camera is determined using a steerable filter. The electronic device detects the edge direction at a precise angle between 0° and 180° by smoothing the direction with the steerable filter, and increases accuracy by correcting the direction error. Thereafter, the electronic device linearly interpolates the direction in the zoom image size and thus determines the edge direction for the adaptive directional image interpolation.

Direction Estimation Using the Steerable Filter

The steerable filter for the direction determination is realized using the linear interpolation of first derivatives of two-dimensional Gaussian functions. The two-dimensional Gaussian function is expressed by Equation 1.

$$G(x,y)=e^{-(x^2+y^2)} \quad (1)$$

In Equation 1, G( ) denotes the Gaussian function.

The first derivative of the Gaussian function in the x direction without rotation and the differentiated Gaussian function with the rotation at 90° are expressed by Equation 2.

$$G^{0*} = \frac{\partial}{\partial x} e^{-(x^2+y^2)} = -2xe^{-(x^2+y^2)}$$

$$G^{90*} = \frac{\partial}{\partial y} e^{-(x^2+y^2)} = -2ye^{-(x^2+y^2)} \quad (2)$$

In Equation 2, $G^0$ denotes the first derivative of the Gaussian function in the x direction without rotation, and $G^{90}$ denotes the derivative of the Gaussian function rotated 90°.

When the two functions in Equation 2 are used as basis functions, the steerable filter at a certain angle θ is expressed by Equation 3.

$$G^\theta = G^{0*} \cos\theta + G^{90*} \sin\theta \quad (3)$$

In Equation 3, $G^\theta$ denotes the steerable filter at the angle θ, $G^0$ denotes the first derivative of the Gaussian function in the x direction without rotation, and $G^{90}$ denotes the first derivative of the Gaussian function rotated 90°.

When the input image is/, the image filtered in horizontal and vertical direction may be expressed by Equation 4.

$$R^{0*} = G^{0*} \times I$$

$$R^{90*} = G^{90*} \times I \quad (4)$$

In Equation 4, $R^0$ denotes the image filtered horizontally, $R^{90}$ denotes the image filtered vertically, $G^0$ denotes the first derivative of the Gaussian function in the x direction without rotation, and $G^{90}$ denotes the first derivative of the Gaussian function rotated 90°.

A value in the image at the certain angle based on Equation 3 and Equation 4 is calculated according to Equation 5.

$$R^\theta = R^{0*} \cos\theta + R^{90*} \sin\theta \quad (5)$$

In Equation 5, $R^\theta$ denotes the image filtered by the steerable filter of the angle θ, $R^0$ denotes the image filtered horizontally, and $R^{90}$ denotes the image filtered vertically.

Herein, the steerable filters may be utilized in a predefined manner. For example, the electronic device may define four filters of angles 0°, 45°, 90°, and 135° in advance and use the stored filters for the direction estimation. Alternatively, the electronic device may generate and use at least one filter of an optimized angle in some cases.

FIGS. 2A-2H depict steerable filters with various directions according to an exemplary embodiment of the present invention.

Referring to FIGS. 2A-2H, the steerable filters select parameters with a filter size of 5×5 and a variance σ of 1.0 by considering memory and noise sensitivity. In FIGS. 2A-2H, the filters have 0°, 45°, 90°, 135°, 180°, 225°, 270°, and 315°. To detect the edge direction, four filters of the angles 0°, 45°, 90°, and 135° may be used. By use of the filters of FIGS. 2A-2H, the direction may be determined as shown in FIG. 3.

Figure 3:
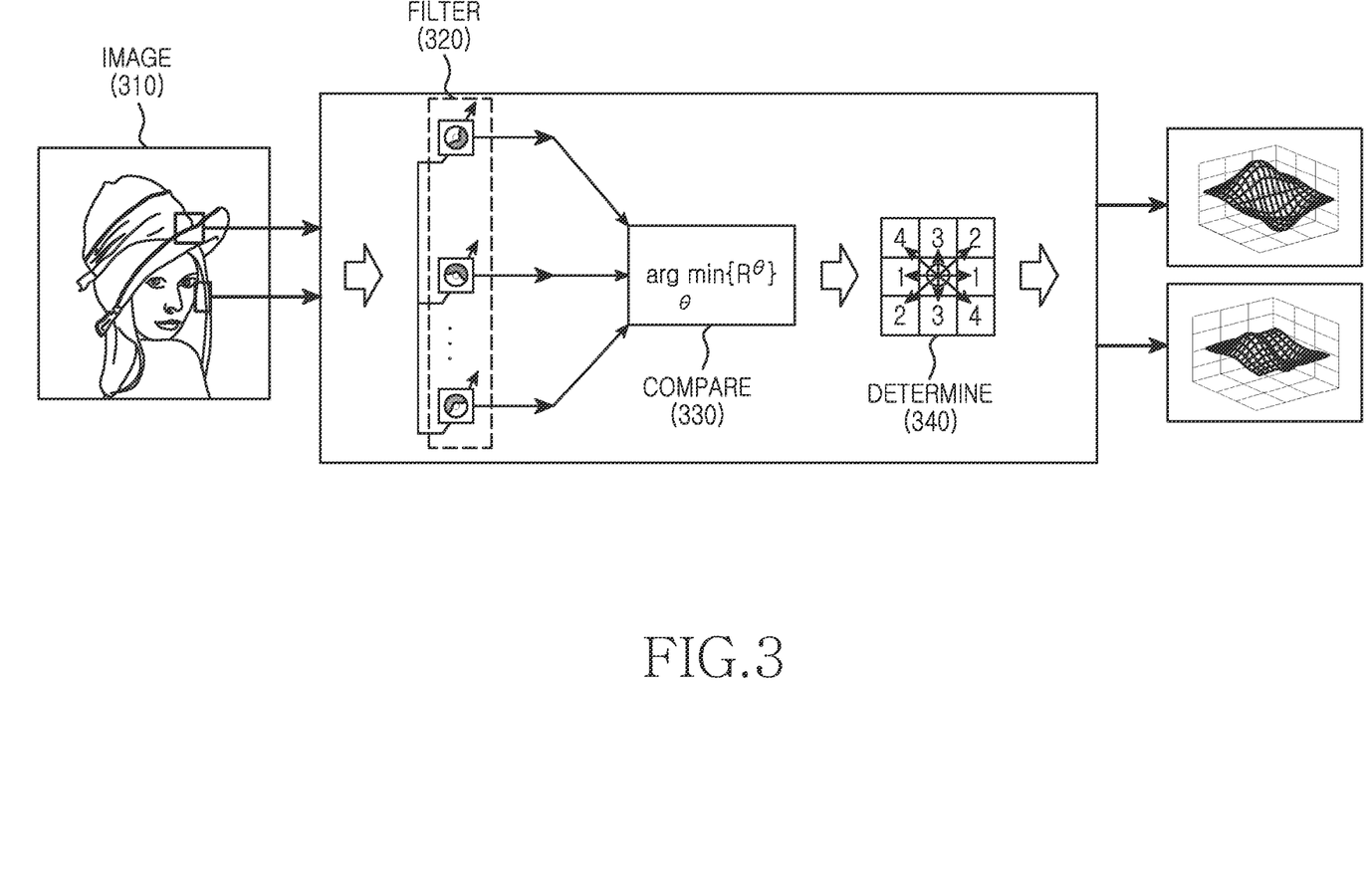
FIG. 3 illustrates a direction determination algorithm using a steerable filter according to an exemplary embodiment of the present invention.

FIG. 3 illustrates a direction determination algorithm using a steerable filter according to an exemplary embodiment of the present invention.

Referring to FIG. 3, an image is input at step 310. Thereafter, the electronic device filters the image by convolutionally operating four filters in a 3×3 local block based on a particular pixel in step 320. Next, the electronic device determines the smallest angle of the convolution results based on a comparison in step 330. In step 340, the electronic device estimates the smallest angle as the direction of the corresponding pixel.

Edge Direction Smoothing

The direction estimation using the four-direction steerable filters may be insufficient for the accurate edge direction. In other words, the estimation result using the filters is limited to one of a plurality of particular angles indicated by the filters. Also, noise may lead to the wrong direction being estimated. As a result, a problem may arise in the adaptive directional image interpolation. Hence, the electronic device determines the range of the edge direction based on ranges of angles as shown in FIG. 4.

Figure 4:
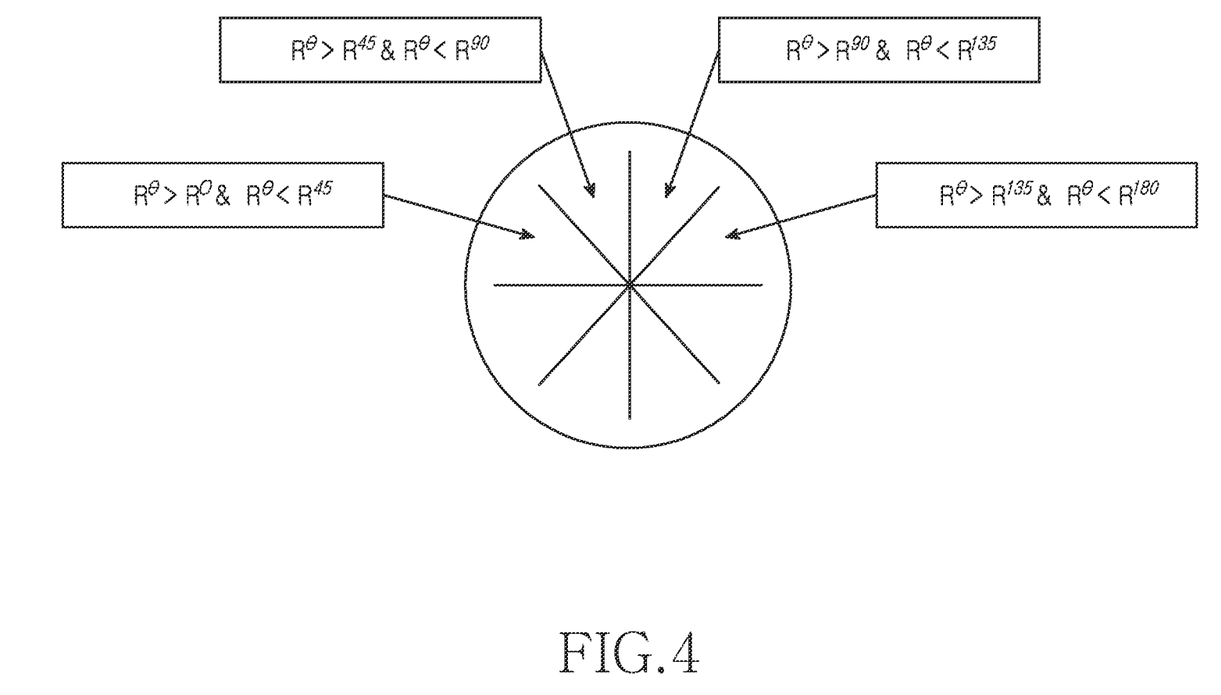
FIG. 4 illustrates a range of a direction determination according to an exemplary embodiment of the present invention.

FIG. 4 illustrates a range of a direction determination according to an exemplary embodiment of the present invention.

Referring to FIG. 4, the electronic device determines the range of the edge direction based on ranges of angles 0° through 45°, 45° through 90°, 90° through 135°, and 135° through 180° and estimates the direction more finely by considering intensities of two angles being the basis of the determination range. When every filtered value $R^\theta$ in the four defined directions is greater than a threshold, the corresponding pixel is determined to be flat. When the filtered values $R^\theta$ have little difference, the corresponding pixel is considered as noise. In this case, the electronic device does not estimate the edge.

The electronic device estimates the direction in every direction between 0° and 180° by applying the intensity of the two directions which define the range for the estimated edge direction of a particular pixel, as the weight. For example, the direction may be estimated based on Equation 6.

$$\theta^* = \frac{R^0}{R^0 + R^{45}} \times 45,$$

$$0 \leq \hat{\theta} \leq 45$$

$$\theta^* = \frac{45 \times R^{90} + 90 \times R^{45}}{R^{45} + R^{90}},$$

$$45 \leq \hat{\theta} \leq 90$$

$$\theta^* = \frac{90 \times R^{135} + 135 \times R^{90}}{R^{90} + R^{135}},$$

$$90 \leq \hat{\theta} \leq 135$$

$$\theta^* = \frac{135 \times R^{80} + 180 \times R^{135}}{R^{135} + R^0},$$

$$135 \leq \hat{\theta} \leq 180 \quad (6)$$

In Equation 6, θ* denotes the fine edge direction through the smoothing, $R^\theta$ denotes the image filtered by the steerable filter of the angle θ, and $\hat{\theta}$ denotes the estimated edge direction being one of the four directions.

Figure 5A:
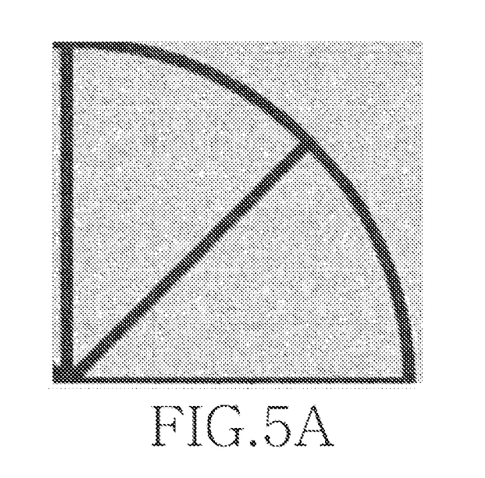
FIGS. 5A-5C illustrate direction smoothing results according to an exemplary embodiment of the present invention.
Figure 5B:
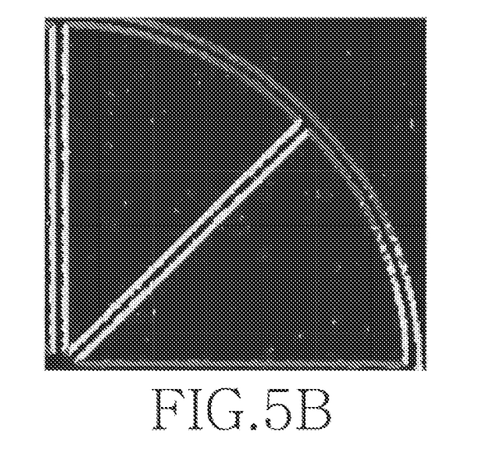
Figure 5C:
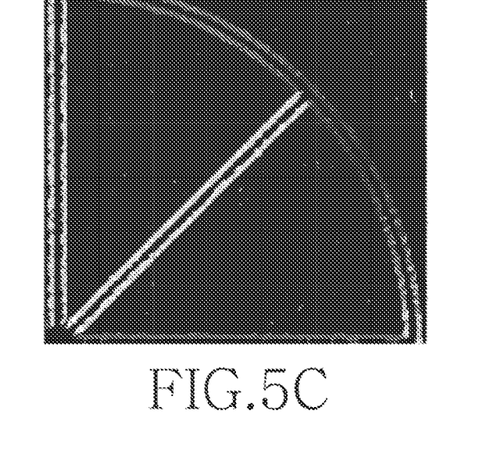

FIGS. 5A-5C depict direction smoothing results according to an exemplary embodiment of the present invention.

Referring to FIGS. 5A-5C, the direction smoothing results are the direction estimation results using the existing directions between 90° and 180° of FIG. 4. FIG. 5A depicts the original image, FIG. 5B depicts the direction estimation result based on the direction estimation between 90°, and 180° of FIG. 4, and 5C depicts the smoothed direction estimation result. In FIGS. 5B and 5C, the estimated angle is represented as a shadow level. Referring to FIGS. 5B and 5C, the estimation result (the shadow) gradually changes according to the variation of the angle after the smoothing. Thus, exemplary embodiments of the present invention may minimize the error in the image interpolation by estimating the more accurate direction.

Direction Error Correction

Another problem associated with the direction estimation is that a wrong direction is estimated in a region in which different edges meet. As a result, noise or artifacts may arise. The region of the different edges abruptly changes the direction.

Figure 6:
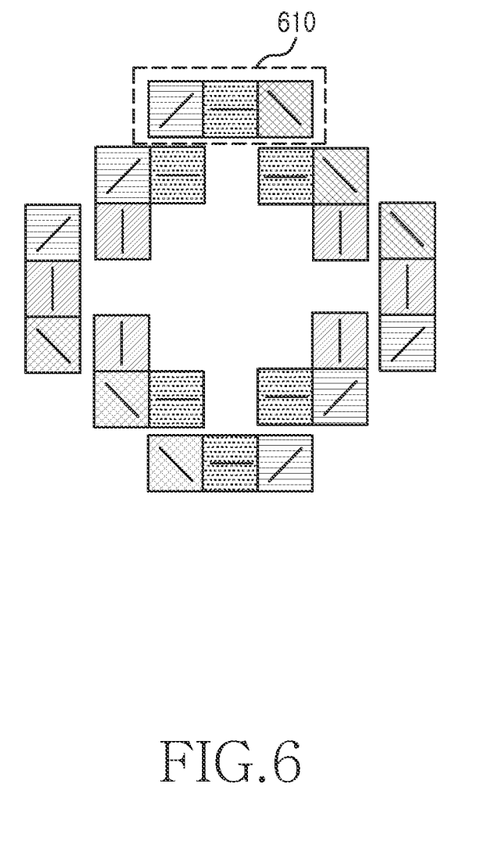
FIG. 6 illustrates a direction abruptly changing in a direction determination result according to an exemplary embodiment of the present invention.

FIG. 6 depicts the direction abruptly changing in a direction determination result according to an exemplary embodiment of the present invention.

Referring to FIG. 6, when a 3×1 block 610 includes three or more directions or inconsistent directions as shown in FIG. 6, the electronic device determines different edges or wrong direction and thus modifies the direction. Hence, the directions of the pixels are unified. For example, when a condition of Equation 7 is not satisfied, the direction needs to be modified.

$$\text{if } \hat{\theta}(i,j)=0, \text{then } \hat{\theta}(i,j-1)=\hat{\theta}(i,j+1)=0$$

$$\text{if } \hat{\theta}(i,j)=45, \text{then } \hat{\theta}(i+1,j-1)=\hat{\theta}(i-1,j+1)=45$$

$$\text{if } \hat{\theta}(i,j)=90, \text{then } \hat{\theta}(i-1,j)=\hat{\theta}(i+1,j)=90$$

$$\text{if } \hat{\theta}(i,j)=135, \text{then } \hat{\theta}(i-1,j-1)=\hat{\theta}(i+1,j+1)=135 \quad (7)$$

In Equation 7, $\hat{\theta}(i,j)$ denotes the direction estimation result positioned at i,j.

The direction estimation results when the condition of Equation 7 is satisfied are shown in FIGS. 7A-7D.

FIGS. 7A-7D illustrates estimation results without directional error according to an exemplary embodiment of the present invention.

Figure 7A:
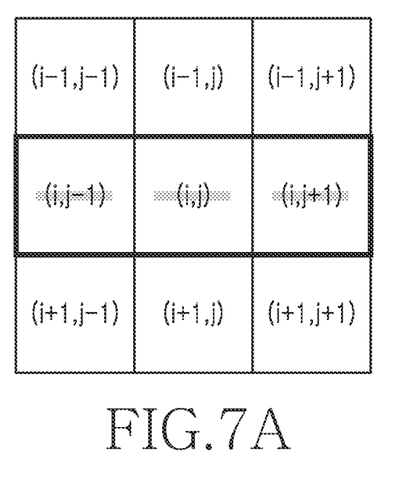
FIGS. 7A-7D illustrate estimation results without directional error according to an exemplary embodiment of the present invention.
Figure 7B:
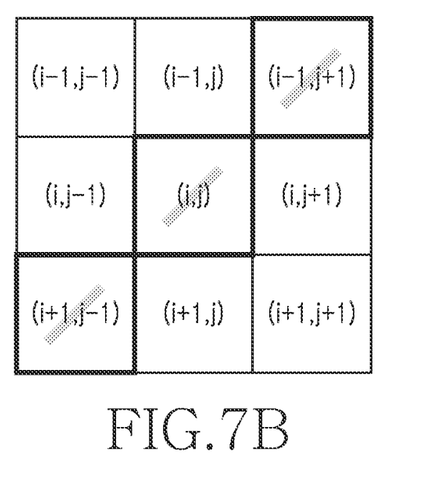
Figure 7C:
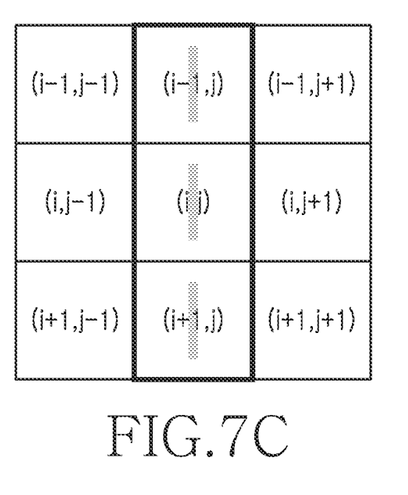
Figure 7D:
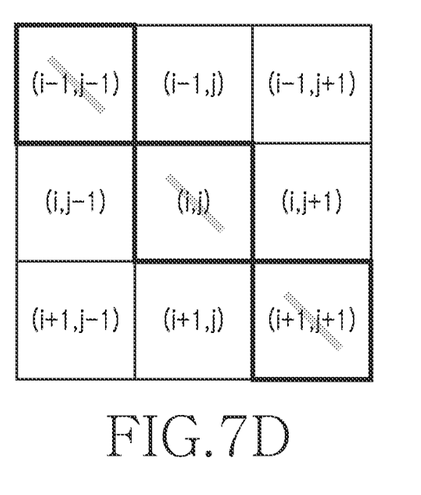

Referring to FIGS. 7A-7D, the direction of the pixel positioned at (i,j) is 0° in FIG. 7A, 45° in FIG. 7B, 90° in FIG. 7C, and 135° in FIG. 7D. For example, when the consistent direction is estimated in the 3×3 block based on the center pixel as shown in FIGS. 7A-7D, no error is determined. In other words, error is determined when the pixels along an extension of the center pixel direction based on the center pixel in a fixed-size block have different directions.

Now, the adaptive directional image interpolation such as, for example, the adaptive directional image interpolation described in relation to step 120 of FIG. 1 is explained.

In the adaptive directional image interpolation of step 120, the electronic device adaptively interpolates the image in each direction using the direction determined in the direction determination of step 110. For example, the electronic device determines other pixel values besides the original pixel in the magnified image.

Figure 8:
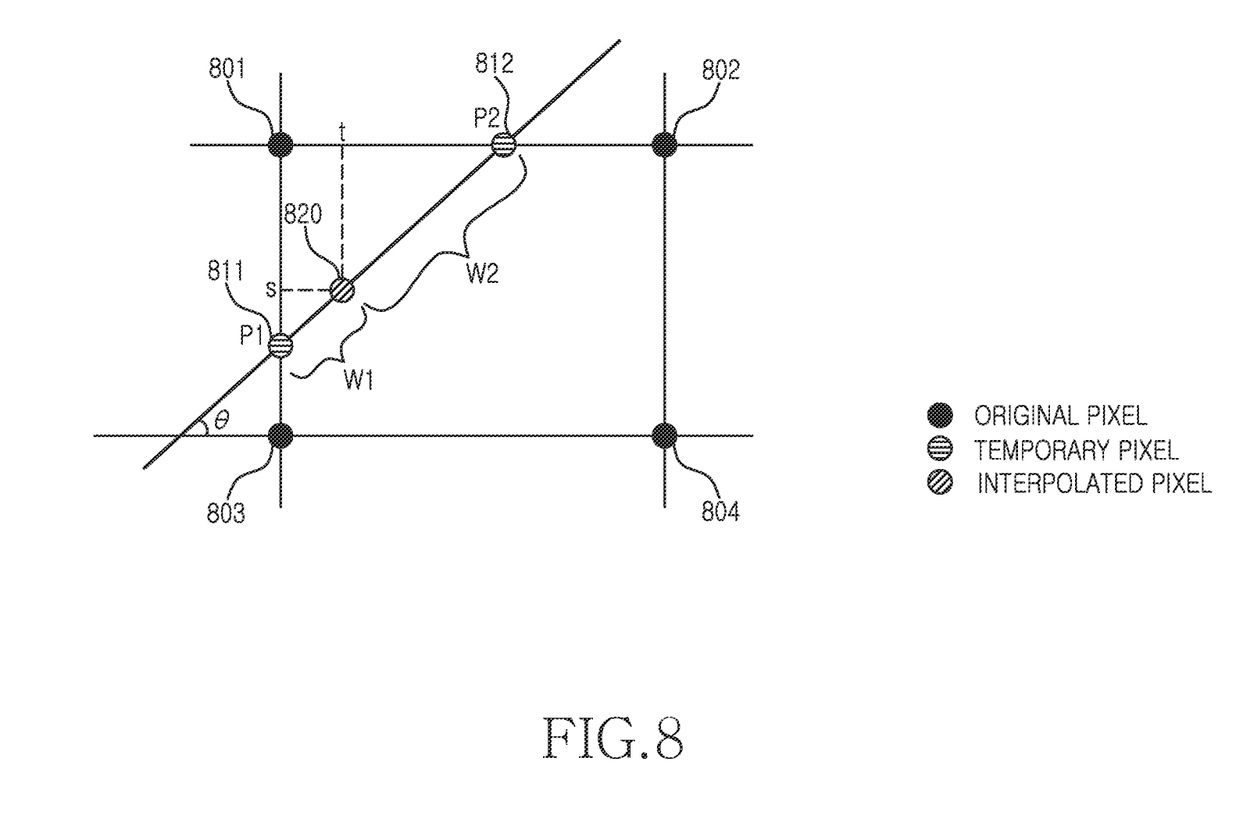
FIG. 8 illustrates an adaptive directional image interpolation algorithm according to an exemplary embodiment of the present invention.

FIG. 8 illustrates an adaptive directional image interpolation algorithm according to an exemplary embodiment of the present invention.

Referring to FIG. 8, a pixel value 820 to interpolate is determined based on original image pixels 801 through 804. The pixel 820 to interpolate indicates a new pixel, beside the original pixels, in the enlarged image. For example, the new pixel corresponds to a pixel added to the enlarged image. The electronic device knows an x-axis distance t and a y-axis distance s from the original pixel 801 according to the position of the pixel 820 to interpolate, and also knows the angle of the edge direction. Accordingly, the electronic device sets temporary pixels 811 and 812 at intersections of a straight line of a slope θ corresponding to the edge direction angle passing the interpolation pixel 820, a line segment in parallel with the x axis interconnecting the original pixels 801 and 802, and a line segment in parallel with the y axis interconnecting the original pixels 801 and 803, and determines values of the temporary pixels 811 and 812. For example, the values of the temporary pixels 811 and 812 may be determined by a one-dimensional bicubic algorithm. Hence, the values of the interpolation pixel 820 and the pixels on the straight line are obtained. Thus, the electronic device finally determines the value of the interpolation pixel 820 using the values of the temporary pixels 811 and 812. For example, the value of the pixel 820 to finally interpolate may be determined by linear interpolation.

Hereafter, operations and structure of the electronic device for determining the direction and interpolating the image as stated above are further described.

Figure 9:
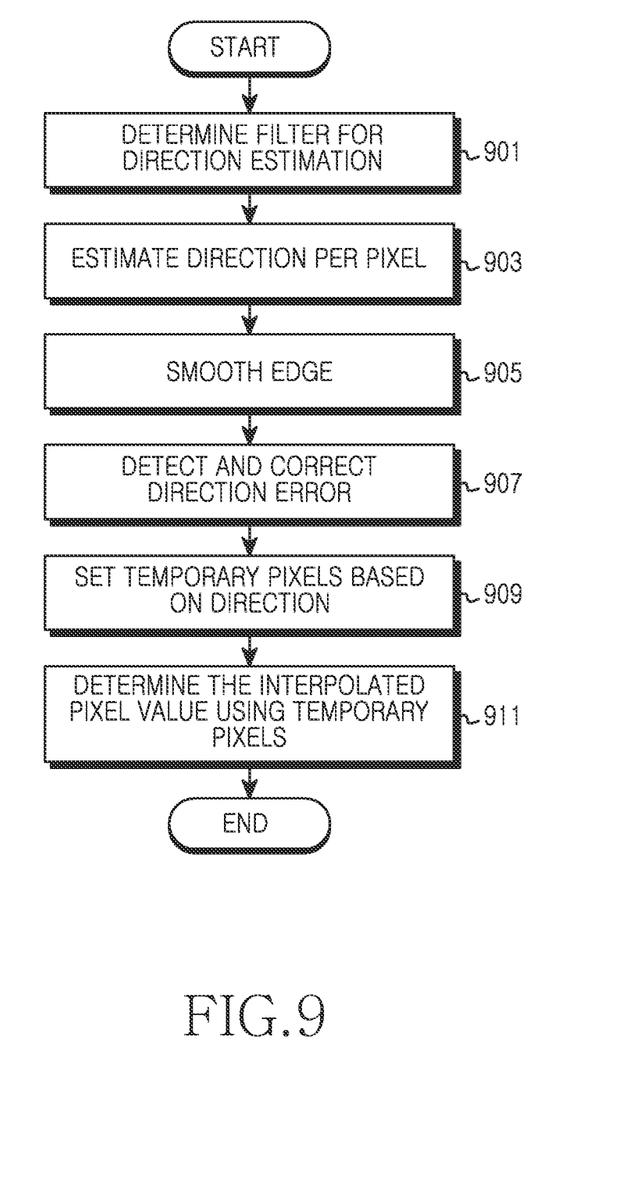
FIG. 9 illustrates operations of an electronic device according to an exemplary embodiment of the present invention.

FIG. 9 illustrates operations of the electronic device according to an exemplary embodiment of the present invention.

Referring to FIG. 9 the electronic device determines at least one filter for the direction estimation in step 901. The filters are the steerable filters, and each filter corresponds to a particular angle direction. For example, the filters may be realized through the linear interpolation of the first derivatives of the two-dimensional Gaussian functions. For example, the filters are determined using the first derivatives of the two-dimensional Gaussian functions, and a sine function value and a cosine function value of the corresponding angle. The electronic device may load a plurality of prestored filters. Alternatively, the electronic device may generate filters corresponding to particular angles. Alternatively, the electronic device may load at least one prestored filter and generate at least one filter corresponding to the particular angle. For example, the filter may be generated based on Equation 1, Equation 2, and Equation 3.

In step 903, the electronic device estimates the direction per pixel using the filters. In detail, the electronic device convolutionally operates the filters in the local block corresponding to the filter size, based on the pixel to estimate the direction. Namely, the electronic device multiplies the pixel values of the local block by the respective filter elements and sums the products. For example, when the filter size is 3×3, the electronic device multiples 9 pixels in the 3×3 local black by 9 filter elements at the corresponding locations and sums 9 products. Next, the electronic device estimates the direction corresponding to the filter producing a minimum convolution value as the direction of the corresponding pixel. The filtering and the direction estimation are repeated per pixel.

In step 905, the electronic device smoothes the edge direction. The edge direction smoothing corrects the direction estimated by the filters at a finer angle. For doing so, the electronic device determines the range of each pixel based on the angle corresponding to the filters used for the direction estimation, applies the filtering value, as the weight, of two directions defining the range, and thus corrects the direction of the corresponding pixel. For example, the electronic device corrects the direction based on Equation 6.

In step 907, the electronic device detects a direction estimation error and corrects the error. The direction estimation error can mostly arise in the region in which different edges meet in the image. To detect the error, the electronic device determines whether different directions exceeding a fixed number are estimated in the fixed-size block. For example, the electronic device determines whether the direction estimation has error, according to a direction distribution of neighboring pixels. For example, the error may be detected when the 3×3 block includes three or more different directions. More specifically, the direction estimation error may be determined according to whether the condition of FIGS.

7A-7D are satisfied. When the pixels along the extension of the direction of the center pixel have different directions based on the center pixel of the fixed-size block, the electronic device determines error. When detecting the direction estimation error, the electronic device modifies the direction of the corresponding pixel by considering the direction of the neighboring pixels. The electronic device modifies the direction such that the pixels along the extension of the direction of the center pixel have the same direction based on the center pixel of the fixed-size block.

Thus, the directions of the pixels may be consistent.

In step 909, the electronic device sets the temporary pixels by considering the direction of each pixel. The electronic device calculates the position of the pixel to interpolate according to the magnification. Next, the electronic device determines the straight line of the slope passing the pixel to interpolate and corresponding to the direction angle, and sets the temporary pixels at the intersections of the straight line and the horizontal and vertical line segments defined based on the original pixels. The electronic device determines the values of the temporary pixels using the original pixel values. For example, the temporary pixel values may be determined by the one-dimensional bicubic algorithm.

In step 911, the electronic device determines the interpolation pixel value using the temporary pixels. The interpolation pixel is placed on the same straight line as the temporary pixels. Accordingly, the electronic device may determine the interpolation pixel value by interpolating the temporary pixel values. For example, the interpolation pixel value may be determined by the linear interpolation.

The method described above in relation with FIG. 9 under of the present invention may be provided as one or more instructions in one or more software modules, or computer programs stored in an electronic device including a portable terminal.

The present invention may be implemented in an electronic device including a portable terminal such as, for example, a smart phone and a mobile telecommunication terminal. Hereunder, a portable terminal is used as an example for the electronic device.

Figure 10:
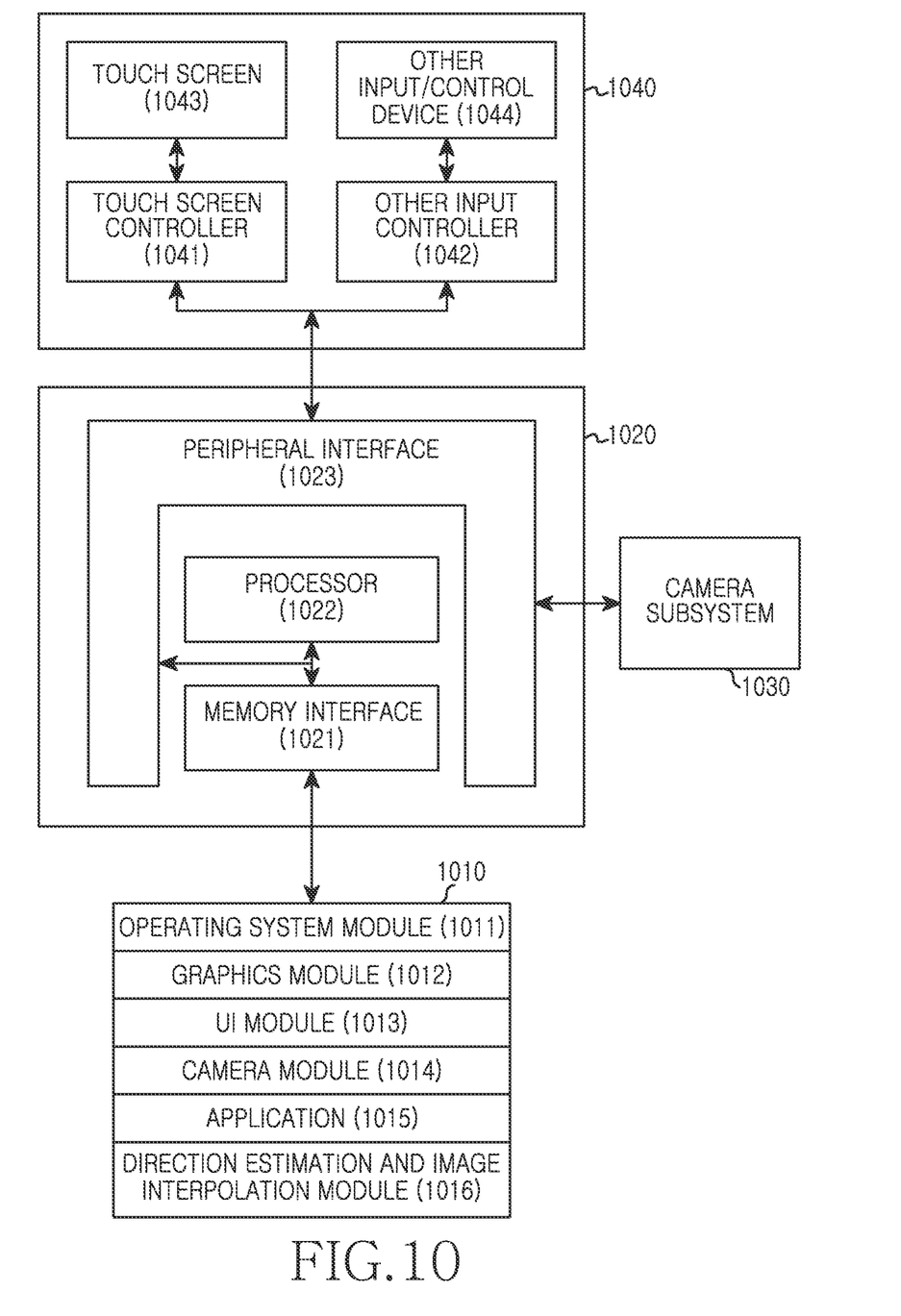
FIG. 10 illustrates an electronic device according to an exemplary embodiment of the present invention.

FIG. 10 is a block diagram of the electronic device according to an exemplary embodiment of the present invention.

Referring to FIG. 10, the electronic device includes a memory 1010, a processor unit 1020, a camera subsystem 1030, and an Input Output (IO) system 1040.

According to exemplary embodiments of the present invention, the electronic device may include a plurality of memories 1010.

The components of the electronic device of FIG. 10 may be coupled by at least one communication bus (not shown) or stream line (not shown).

The memory 1010 may be connected to a memory interface 1021. The memory 1010 may include at least one of a fast random access memory such as at least one magnetic disc storage, a non-volatile memory, at least one optical storage, and a flash memory (e.g., NAND and NOR). The memory 1010 may include a non-transitory computer readable storage medium.

The memory 1010 stores at least one software. Software components include an operating system module 1011, a graphics module 1012, a User Interface (UI) module 1013, a camera module 1014, at least one application module 1015, and a direction estimation and image interpolation module 1016. The module being the software component may be represented as a set of instructions, and may be referred to as an instruction set or a program. One or more modules including the instructions for executing exemplary embodiments of the present method may be stored in the memory 1010. The memory 1010 may include an additional module besides the above-stated modules 1011 and 1016. Alternatively, some of the modules 1011 through 1016 may be omitted.

The operating system module 1011 includes at least one software component for controlling general system operations. For example, the general system operation control includes memory management and control, storage hardware control and management, and power control and management. The operating system module 1011 enables normal communication between at least one hardware and at least one software component. The graphics module 1012 includes at least one software component for providing and displaying graphics on a touch screen 1043. Herein, the graphics include a text, a web page, an icon, a digital image, a video, an animation, and so on. The UI module 1013 includes at least one software component relating to a user interface. Data about the user interface is involved in the status change of the user interface and the condition of the user interface status change. The camera module 1014 includes at least one software component for executing camera related processes and functions. The application module 1015 includes at least one application program. The direction estimation and image interpolation module 1016 includes at least one instruction for estimating the direction and determining the interpolation pixel value of the enlarged image. For example, the direction estimation and image interpolation module 1016 may include at least one instruction for the method of FIG. 9. The memory 1010 may store the plurality of the filters for the direction estimation.

The processor unit 1020 may include the memory interface 1021, a processor 1022, and a peripheral interface 1023. The processor 1022 may include at least one hardware chip. According to exemplary embodiments of the present invention, the whole processor unit 1020 may be referred to as a processor. The memory interface 1021, the processor 1022, and the peripheral interface 1023 may be separate components or integrated onto at least one integrated circuit.

The processor 1022 runs a software program and thus controls the electronic device to conduct the function corresponding to the software program, and processes and controls voice communication and data communication. The processor 1022 executes the software module stored in the memory 1010 and conducts a particular function corresponding to the module. The processor module may be referred to as an instruction set. For example, the processor 1022 realizes the present method according to exemplary embodiments of the present invention in association with the software modules stored in the memory 1010. The processor 1022 may include at least one data processor and image processor. The data processor and the image processor may be separate hardware. The processor 1022 may include a plurality of processors for different functions.

The peripheral interface 1023 interconnects the IO subsystem 1040 and at least one peripheral of the electronic device with the processor 1021 and the memory 1010. The memory 1010 may be connected through the memory interface 1021. For example, the memory interface 1021 provides an interface for accessing the memory 1010.

The camera subsystem 130 may be configured to capture a photo and record a video. The camera subsystem 1030 may include an optical sensor and a lens. For example, the camera subsystem 1030 senses the light input through the lens using the optical sensor and digitizes the image sensed by the optical sensor.

The IO subsystem 1040 may include a touch screen controller 1041, other input controller 1042, a touch screen 1043, and other input/control device 1044.

The touch screen controller 1041 may be coupled to the touch screen 1043. The touch screen 1043 and the touch screen controller 1041 may detect the contact, the motion, and the cessation thereof using, but not limited to, capacitive, resistive, infrared and surface sound wave techniques for determining one or more contact points on the touch screen 1043 and a multi-touch detection technique including various proximity sensor arrays or other elements.

The other input controller 1042 may be coupled to the other input/control devices 1044. The other input/control devices 1044 may include one or more up/down buttons for controlling the volume. The button may employ a push button, a rocker button, a rocker switch, a thumb wheel, a dial, a stick, and a pointer device such as stylus.

The touch screen 1043 provides the I/O interface between the electronic device and the user. For example, the touch screen 1043 forwards a user's touch input to the electronic device. The touch screen 1043 is a medium for showing the output of the electronic device to the user. For example, the touch screen 1043 shows a visual output to the user. The visual output may be represented as text, graphic, video, the like, and a combination thereof.

The touch screen 1043 may employ various display means. For example, the touch screen 1043 may include at least one of, but not limited to, a Liquid Crystal Display (LCD), a Light Emitting Diode (LED), a Light emitting Polymer Display (LPD), an Organic LED (OLED), an Active Matrix OLED (AMOLED) or a Flexible LED (FLED).

Although it is not depicted in FIG. 10, the electronic device may include an audio subsystem including a speaker and a microphone, an external port being a physical connection means for interconnecting the electronic device with another electronic device directly or indirectly over a network, and at least one of an acceleration sensor, a gyro sensor, an optical sensor, a geomagnetic sensor, a G-sensor, a temperature sensor, a bio sensor, and a location sensor. The electronic device may include a sensing subsystem for sensing external stimulus, a wireless communication subsystem for providing an interface for wireless communication, and the like.

In the structure of the electronic device of FIG. 10, the direction determination and the adaptive directional image interpolation may be performed by the direction estimation and image interpolation module 1016 stored in the memory 1010. Alternatively, the direction determination and the adaptive directional image interpolation may be embodied using a hardware component. For example, the direction determination and the adaptive directional image interpolation described in FIG. 9 may be performed by a separate processor connected to the camera subsystem 1030 or a particular processor of the processor unit 1020. In this case, the separate processor or the particular processor may be referred to as an Image Signal Processor (ISP).

The methods as described in the claims and/or the specification of exemplary embodiments of the present invention can be implemented using hardware, software, or a combination of them.

As for the software, a non-transitory computer-readable storage medium including one or more programs (software modules) may be provided. One or more programs stored in the non-transitory computer-readable storage medium may be configured for execution by one or more processors of the electronic device. One or more programs include instructions for controlling the electronic device to execute the methods according to the exemplary embodiments as described in the claims and/or the specification of the present invention.

Such a program (software module, software) may be stored to a random access memory, a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs may be stored to a memory combining part or all of those recording media. A plurality of memories may be equipped.

The programs may be stored in an attachable storage device accessible via a communication network such as Internet, Intranet, Local Area Network (LAN), Wide LAN (WLAN), or Storage Area Network (SAN), or a communication network by combining these networks. The storage device can access the present electronic device through an external port. A separate storage device may access the present electronic device over a communication network.

As set forth above, exemplary embodiments of the present invention relate to the digital zoom for stably estimating the direction even in various image environments and interpolating the image based on the estimated direction. The present algorithm finely estimates the edge direction within the range of 0° through 180°, rather than the general 4 directions or 8 directions, and thus the performance of the adaptive directional image interpolation algorithm may be enhanced. In addition, the interpolation algorithm adaptive to the edge direction, which is modified from the bilinear or bicubic interpolation algorithm according to the related art with no great computation, may be applied to a device limited in the hardware performance, for example, a mobile device. Therefore, the jaggies in the digital zoom according to the related art may be notably enhanced and the performance may be greatly improved as the zoom magnification increases.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of an electronic device, the method comprising:
   estimating a direction of pixels using a plurality of filters respectively corresponding to a plurality of angles;
   correcting the direction of the pixels using a direction of neighboring pixels;
   determining whether the direction estimation has an error according to a direction distribution of the neighboring pixels; and
   when the direction estimation is determined to have an error, correcting the error in the direction estimation,
   wherein the filters are determined using first derivatives of two-dimensional Gaussian functions, and a sine function value and a cosine function value of the corresponding angles.

2. The method of claim 1, wherein the correcting of the direction of the pixels comprises:
   determining a range of each pixel based on an angle corresponding to the plurality of filters; and
   correcting the direction of each pixel using a filtering result value of two directions, which define the range, as a weight.

3. The method of claim 1, wherein the determining of whether the direction estimation has the error comprises:

determining whether different directions over a fixed number are estimated in a block of a fixed size.

4. The method of claim 3, wherein the determining of whether the direction estimation has the error comprises:
when pixels along an extension of a direction of a center pixel have different directions based on the center pixel of the fixed-size block, determining the error.

5. The method of claim 1, further comprising:
setting temporary pixels according to a direction of a pixel to interpolate; and
determining a pixel value to interpolate using the temporary pixels.

6. The method of claim 5, wherein the setting of the temporary pixels comprises:
setting the temporary pixels at intersections of a straight line passing the pixel to interpolate and having a slope corresponding to the direction angle of the pixel to interpolate, and horizontal and vertical line segments defined based on original pixels; and
determining temporary pixel values using original pixel values.

7. The method of claim 6, wherein the temporary pixel values are determined by a one-dimensional bicubic algorithm.

8. The method of claim 6, wherein the pixel value to interpolate is determined by linear interpolation.

9. An electronic device comprising:
a memory configured to store at least one software module executed by a processor; and
the processor configured to execute the at least one software module,
wherein the at least one software module comprises at least one instruction for estimating a direction of pixels using a plurality of filters respectively corresponding to a plurality of angles, correcting the direction of the pixels using a direction of neighboring pixels, determining whether the direction estimation has an error according to a direction distribution of the neighboring pixels, and when the direction estimation is determined to have an error, correcting the error in the direction estimation,
wherein the filters are determined using first derivatives of two-dimensional Gaussian functions, and a sine function value and a cosine function value of the corresponding angles.

10. The electronic device of claim 9, wherein the at least one software module comprises at least one instruction for determining a range of each pixel based on an angle corresponding to the plurality of filters, and correcting the direction of each pixel using a filtering result value of two directions which define the range, as a weight.

11. The electronic device of claim 9, wherein, to determine whether the direction estimation has the error, the at least one software module comprises at least one instruction for determining whether different directions over a fixed number are estimated in a block of a fixed size.

12. The electronic device of claim 11, wherein, to determine whether the direction estimation has the error, the at least one software module comprises at least one instruction for determining whether pixels along an extension of a direction of a center pixel have the same direction based on the center pixel of the fixed-size block.

13. The electronic device of claim 9, wherein the at least one software module further comprises at least one instruction for setting temporary pixels according to a direction of a pixel to interpolate, and determining a pixel value to interpolate using the temporary pixels.

14. The electronic device of claim 13, wherein, to set the temporary pixels, the at least one software module comprises at least one instruction for setting the temporary pixels at intersections of a straight line passing the pixel to interpolate and having a slope corresponding to the direction angle of the pixel to interpolate, and horizontal and vertical line segments defined based on original pixels, and determining temporary pixel values using original pixel values.

15. The electronic device of claim 14, wherein the temporary pixel values are determined by a one-dimensional bicubic algorithm.

16. The electronic device of claim 14, wherein the pixel value to interpolate is determined by linear interpolation.

17. An electronic device comprising:
a processor configured to estimate a direction of pixels using a plurality of filters respectively corresponding to a plurality of angles respectively, correcting the direction of the pixels using a direction of neighboring pixels, determining whether the direction estimation has an error according to a direction distribution of the neighboring pixels, and when the direction estimation is determined to have an error, correcting the error in the direction estimation,
wherein the filters are determined using first derivatives of two-dimensional Gaussian functions, and a sine function value and a cosine function value of the corresponding angles.

18. The electronic device of claim 17, wherein, to correct the direction of the pixels, the processor determines a range of each pixel based on an angle corresponding to the plurality of filters, and corrects the direction of each pixel using a filtering result value of two directions which define the range, as a weight.

19. The electronic device of claim 17, wherein, to determine whether the direction estimation has the error, the processor determines whether different directions over a fixed number are estimated in a block of a fixed size.

20. The electronic device of claim 19, wherein, when pixels along an extension of a direction of a center pixel have different directions based on the center pixel of the fixed-size block, the processor determines the error.

21. The electronic device of claim 17, wherein the processor sets temporary pixels according to a direction of a pixel to interpolate, and determines a pixel value to interpolate using the temporary pixels.

22. The electronic device of claim 21, wherein, to set the temporary pixels, the processor sets the temporary pixels at intersections of a straight line passing the pixel to interpolate and having a slope corresponding to the direction angle of the pixel to interpolate, and horizontal and vertical line segments defined based on original pixels, and determines temporary pixel values using original pixel values.

23. The electronic device of claim 22, wherein the temporary pixel values are determined by a one-dimensional bicubic algorithm.

24. The electronic device of claim 22, wherein the pixel value to interpolate is determined by linear interpolation.

25. A non-transitory computer-readable storage medium for comprising one or more programs comprising instructions, when executed by an electronic device, controlling the electronic device to fulfill a method of claim 1.

* * * * *